United States Patent
Pfaff et al.

(10) Patent No.: US 7,513,238 B2
(45) Date of Patent: Apr. 7, 2009

(54) DIRECTLY INJECTING INTERNAL COMBUSTION ENGINE

(75) Inventors: Ruediger Pfaff, Stuttgart (DE); Martin Schnabel, Aalen (DE); Joachim Suess, Ludwigsburg (DE)

(73) Assignee: Daimler AG, Stuttgart (DE)

( * ) Notice: Subject to any disclaimer, the term of this patent is extended or adjusted under 35 U.S.C. 154(b) by 115 days.

(21) Appl. No.: 10/577,797

(22) PCT Filed: Oct. 15, 2004

(86) PCT No.: PCT/EP2004/011637

§ 371 (c)(1),
(2), (4) Date: Mar. 27, 2007

(87) PCT Pub. No.: WO2005/047667

PCT Pub. Date: May 26, 2005

(65) Prior Publication Data

US 2007/0193556 A1    Aug. 23, 2007

(30) Foreign Application Priority Data

Oct. 29, 2003    (DE) ................................. 103 50 795

(51) Int. Cl.
*F02B 19/08* (2006.01)
*F02B 19/14* (2006.01)
*F02F 3/26* (2006.01)

(52) U.S. Cl. ................. 123/276; 123/299; 123/305
(58) Field of Classification Search ................. 123/263, 123/276, 278, 298–300, 304, 305, 266, 267, 123/275, 279
See application file for complete search history.

(56) References Cited

U.S. PATENT DOCUMENTS 6,161,518 A * 12/2000 Nakakita et al. ............. 123/298
7,156,069 B2 * 1/2007 Ono et al. .................... 123/276

(Continued)

FOREIGN PATENT DOCUMENTS

DE    1 219 283    6/1966

(Continued)

OTHER PUBLICATIONS

International Search Report.
International Search Report, Jan. 28, 2005.

*Primary Examiner*—Willis R Wolfe, Jr.
(74) *Attorney, Agent, or Firm*—Crowell & Moring LLP

(57) ABSTRACT

A directly injecting internal combustion engine has at least one cylinder which has a combustion space and in which a piston executes an oscillating movement, and an injection nozzle for the injection of fuel into the combustion space. The piston has a piston recess which has in its central region an elevation extending in the direction of a cylinder head. A surface of the piston recess which adjoins the elevation in the direction of the recess edge is connected to the elevation via a radius so an injection jet impinging in this region and injected at the earliest possible time point is distributed both in the elevation direction and in the recess edge direction. The surface adjoining the elevation in that direction has an extent in that direction such that an injection jet injected at the latest possible time point impinges onto the surface and is distributed both in the elevation direction and in the recess edge direction.

14 Claims, 4 Drawing Sheets

U.S. PATENT DOCUMENTS

| | | | |
|---|---|---|---|
| 7,415,963 B2 * | 8/2008 | Chmela et al. | 123/299 |
| 2002/0117146 A1 | 8/2002 | Gatellier et al. | |
| 2003/0217732 A1 * | 11/2003 | Kataoka et al. | 123/276 |
| 2004/0123832 A1 * | 7/2004 | Quigley et al. | 123/276 |

FOREIGN PATENT DOCUMENTS

| | | |
|---|---|---|
| DE | 196 49 052 A1 | 5/1998 |
| EP | 1 291 516 A2 | 3/2003 |

* cited by examiner

US 7,513,238 B2

DIRECTLY INJECTING INTERNAL COMBUSTION ENGINE

BACKGROUND AND SUMMARY OF THE INVENTION

This application is a National Phase of PCT/EP2004/011637, filed Oct. 15, 2004, and claims the priority of German patent document DE 103 50 795.7, filed Oct. 29, 2003, the disclosure of which is expressly incorporated by reference herein.

The present invention relates to a directly injecting internal combustion engine with at least one cylinder which has a combustion space and in which a piston executes an oscillating movement.

A known internal combustion engine is described in U.S. patent publication No. 2002/0117146 A1. In this case, the fuel is injected at a relatively steep injection angle into the combustion space, and the piston recess is adapted at least partially to the injection angle.

In an internal combustion engine described in DE 196 49 052 A1, a special shape of the piston recess is likewise provided, in order to achieve an additional reduction in the pollutants emitted by the internal combustion engine.

When early homogenization is to be achieved within the combustion space of an operating internal combustion engine, in particular a diesel internal combustion engine, then injection time points of approximately 130 to 30° before the top dead center of the piston must be selected, since, at this time point, the combustion space pressure is still relatively low, so that the injected fuel can penetrate very deeply into the combustion space. In order to prevent the injection jet from impinging onto the cylinder wall or the liner, as steep an injection angle as possible at the injection nozzle should be selected, in order to ensure as long a free jet length as possible. This also requires the shape of the piston recess to be adapted to this injection, as is the case, for example, in US 2002/0117146 A1.

Since, however, it is not possible to operate the internal combustion engine with a homogeneous combustion process over its entire characteristic map, the piston recess must be designed both for homogeneous and for conventional mixture formation. This is not easily possible in known solutions.

An object of the present invention, therefore, is to provide a directly injecting internal combustion engine, in which the shape of the piston recess is configured such that the internal combustion engine can be operated by both a homogeneous and a conventional combustion process.

This object has been achieved, according to the invention providing that a surface of the piston recess which adjoins the elevation in the direction of the recess edge is connected to the elevation via a radius in such a way that an injection jet impinging in this region and injected at the earliest possible time point is distributed both in the direction of the elevation and in the direction of the recess edge, and in that the surface adjoining the elevation in the direction of the recess edge has an extent in the direction of the recess edge such that an injection jet injected at the latest possible time point impinges onto the surface, the injection jet injected at the latest possible time point being distributed both in the direction of the elevation and in the direction of the recess edge.

The solution according to the invention ensures that the injection jet always impinges on the piston recess such that the injected fuel can be intermixed optimally with the air located in the combustion space, specifically independently of the time point of injection. Particularly the fact that an injection jet injected at the latest possible time point always impinges onto the surface adjoining the elevation ensures that the momentum of the impinging injection jet is not nullified, i.e., with the result from nullification that it could no longer be used optimally for mixture formation, which, in turn, would entail an increased formation of black smoke.

An internal combustion engine is thus afforded which can easily be operated by both a homogeneous and a conventional combustion process.

Other objects, advantages and novel features of the present invention will become apparent from the following detailed description of the invention when considered in conjunction with the accompanying drawings.

DETAILED DESCRIPTION OF THE DRAWINGS

Figure 1:
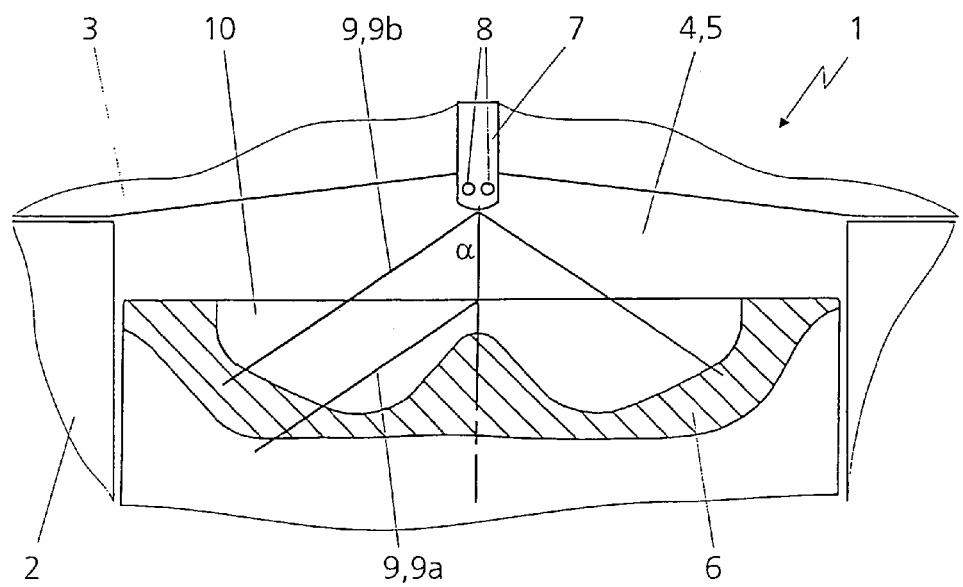
FIG. 1 is a partial, cross-sectional view of an internal combustion engine according to the invention with a piston oscillating in a combustion space of the latter and with an injection jet impinging on the piston recess of the piston.

FIG. 1 shows an internal combustion engine 1 which has a crankcase 2 and a cylinder head 3. Within the crankcase 2 of the internal combustion engine 1 is located at least one cylinder 4 which has a combustion space 5 and in which a piston 6 executes an oscillating movement in a way known per se. Arranged in the cylinder head 3 is an injection nozzle 7 having a plurality of injection orifices 8 from which an injection jet 9 emerges. In the present embodiment, the opening angle α of the injection jet 9 is relatively steep and lies in a range of between 50° and 120°. Thus, fuel is thereby injected directly into the combustion space 5, so that this is a directly injecting internal combustion engine 1.

FIG. 1 depicts two different injection jets, to be precise an injection jet 9a, which is obtained when the piston 6 is at a top dead center, and an injection jet 9b, which is obtained in the case of fuel injection at the latest possible injection time point. The injection jets 9a and 9b are in each case illustrated merely as axes of an injection cone being distributed within the combustion space 5.

The piston 6 has a piston recess 10 in its side facing the cylinder head 3. In the following, the contour of the piston recess 10 and its adaptation to the injection jets 9 are explained in more detail, and, for the sake of clarity, the individual figures in each case indicate only those reference symbols which are relevant for describing the respective figure. The piston recess 10 is identical in all the drawing figures.

Figure 2:
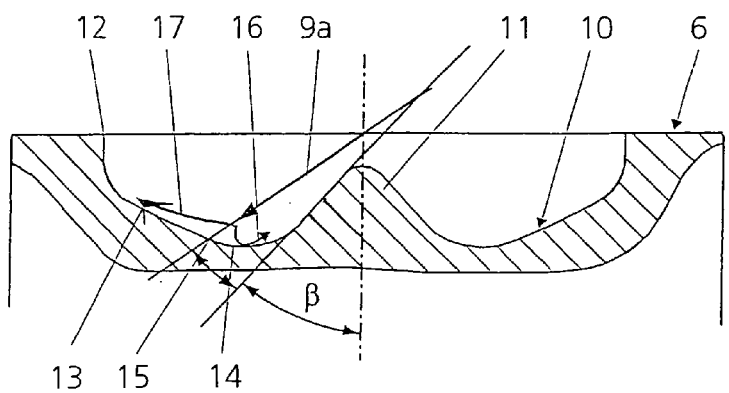
FIG. 2 is a cross-sectional view of the configuration of the piston recess of the piston shown in FIG. 1 in a first region.

As can be seen in FIG. 2, the piston recess 10 has in its central region an elevation 11 extending in the direction of the cylinder head 3. The elevation 11 in this case has an angle β with respect of the pistons axis which is smaller than half the injection angle α, so that the outermost edge of the injection jet 9a, illustrated here as a mid-axis, does not come into contact with the elevation 11.

Figure 3:
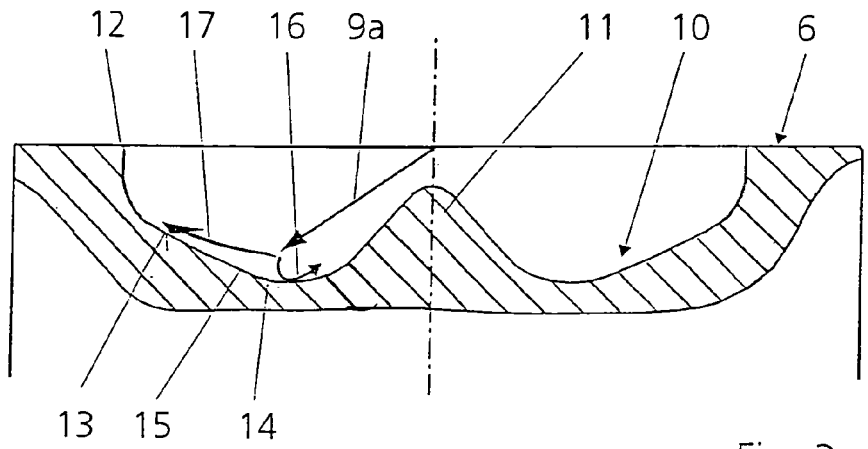
FIG. 3 is a cross-sectional view of the configuration of the piston recess of the piston shown in FIG. 1 in a second region.

As can be seen in FIG. 2 and FIG. 3, the elevation 11 has adjoining it in the direction of a recess edge 12, that is to say the end of the piston recess 10, a surface 13 which is connected to the elevation 11 via a radius 14 so that the injection jet 9a injected at the earliest possible time point impinges onto the surface 13 at an impingement point 15 and is distributed both in the direction of the elevation 11 and in the direction of the recess edge 12. This distribution of the injection jet 9a is important in order to intermix the fuel as effectively as possible with the air located in the combustion space 5.

Owing to the above-described steeper angle β of the elevation 11, as compared with the injection angle α, there is still sufficient free space in the region from the impingement point 15 of the injection jet 9a on the surface 13 to the elevation 11 to ensure that the fuel quantity deflected in the direction of the elevation 11 can be effectively distributed. The fuel deflected in the direction of the elevation 11 is designated by the arrow 16, whereas the fuel deflected in the direction of the recess edge 12 is designated by the arrow 17. It can be seen here, by the length of the arrows, that the fuel quantity deflected or distributed in the direction of the recess edge 12 is greater than the fuel quantity deflected in the direction of the elevation 11. The radius 14 should be selected, in this respect, such that an accumulation of the fuel flowing back is avoided.

Figure 4:
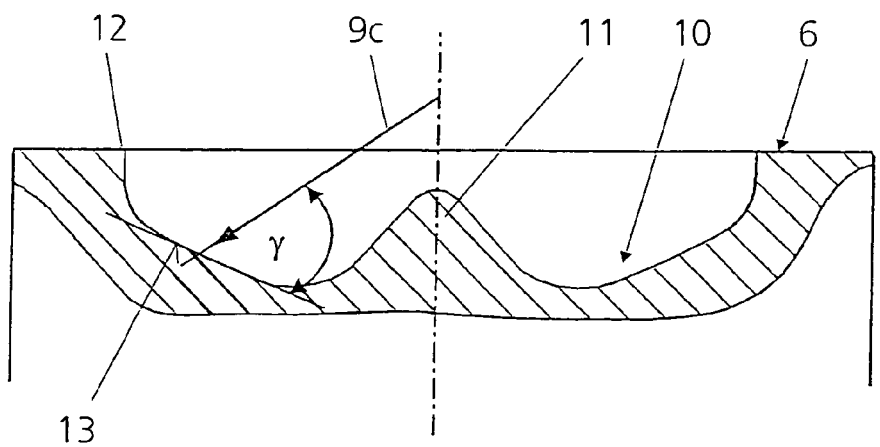
FIG. 4 is a cross-sectional view of the configuration of the piston recess of the piston shown in FIG. 1 in a third region.

FIG. 4 shows that the surface 13 adjoining the elevation 11 in the direction of the recess edge 12 is of essentially planar design and has an ascending gradient in the direction of the recess edge 12. In other words, the surface 13 forms a plane which is at a constant angle γ to the injection jet 9 over the entire maximum injection duration. The angle γ may be varied as a function of the required momentum deflection of an injection jet 9c in this case impinging in the middle region of the surface 13, with the main momentum taking place in the direction of the recess edge 12, as mentioned above. If appropriate, the surface 13 adjoining the elevation 11 in the direction of the recess edge 12 may have a curved configuration.

Figure 5:
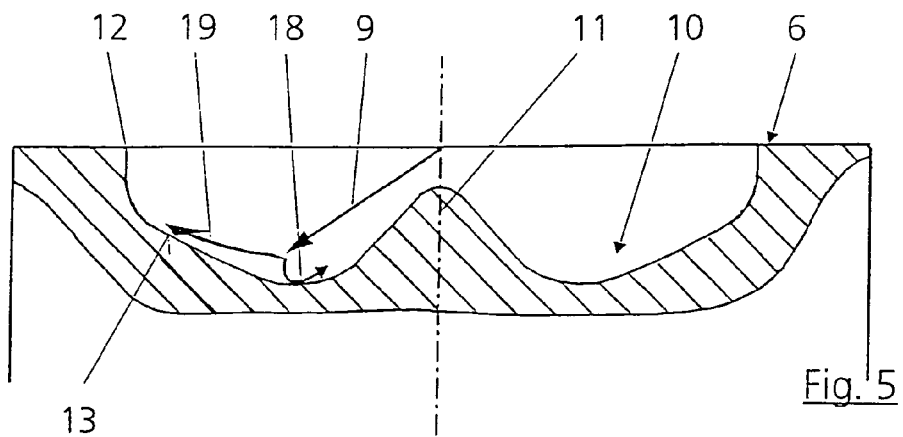
FIG. 5 is a cross-sectional view showing the deflection of the injected fuel jet into that region of the piston recess which is illustrated in FIG. 4.

FIG. 5 illustrates with the length of arrows 18 and 19 that, during the entire fuel injection, a smaller fraction of the injection jet 9 is thereby conducted in the direction of the elevation 11 and a larger fraction is thereby conducted in the direction of the recess edge 12. The arrow 18 in this case shows the fuel quantity conducted in the direction of the elevation 11, whereas the arrow 19 shows the fuel quantity conducted in the direction of the recess edge 12.

The distance of the surface 13 from the injection nozzle 7 should be selected such that the injection jet 9 can achieve a sufficiently free jet length and therefore an optimum jet velocity and the optimum momentum. Depending on the number of injection orifices 8 of the injection nozzle 7, an interaction of the fuel deflected on the piston recess 10 between two injection jets 9 is possible, thus additionally contributing to the capture of air in the combustion space 5. In addition, the division of the fuel may also be assisted by swirl.

Figure 6:
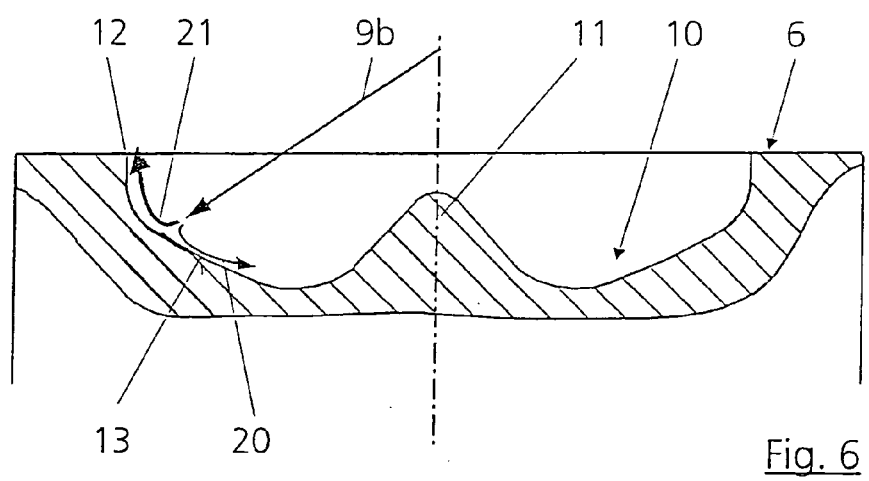
FIG. 6 is a cross-sectional view of the configuration of the piston recess of the piston shown in FIG. 1 in a fourth region.

FIG. 6 illustrates the injection jet 9b injected at the latest possible time point. In this case, the surface 13 has an extent in the direction of the recess edge 12 such that the injection jet 9b injected at the latest possible time point impinges onto the surface 13. In this region, too, the surface 13 is configured in such a way that the injection jet 9b is distributed both in the direction of the elevation 11 and in the direction of the recess edge 12. The fuel quantity distributed in the direction of the elevation 11 is designated by an arrow 20 and the fuel quantity distributed in the direction of the recess edge 12 is designated by an arrow 21. Thus, a vertical impingement of the injection jet 9 on the piston recess 10 is prevented, and it is ensured that the momentum of the injection jet 9b is maintained.

Figure 7:
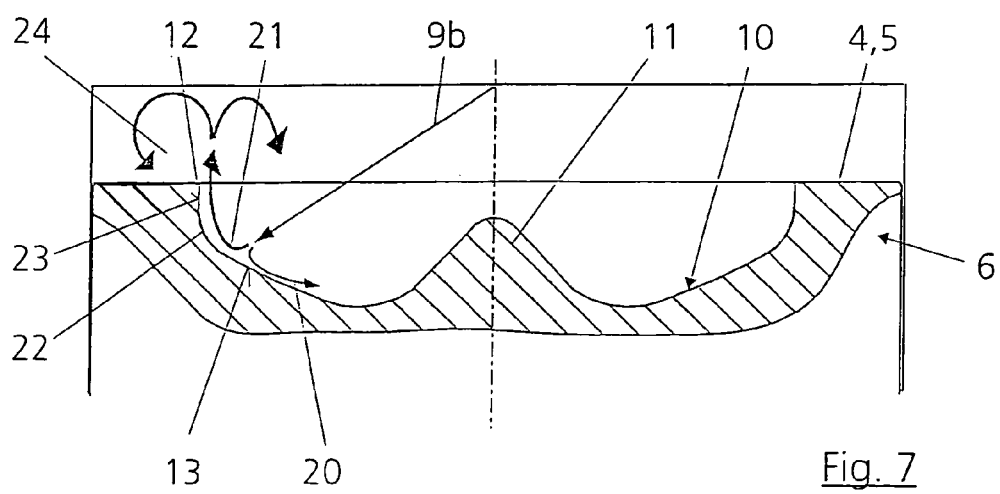
FIG. 7 is a cross-sectional view showing the air capture in a sixth region of the piston recess.

It is apparent from FIG. 7 that the surface 13 has adjoining it a surface 23 connected to the recess edge 12 via a radius 22. At the recess edge 12, a pinch gap region 24, as it may be referred to, at or above an upper surface 25 of the piston 6 occurs, which pinches the fuel/air mixture in the edge region in the direction of the piston recess 10 and thereby reduces the emission of hydrocarbons and carbon monoxide. The pinch gap region 24 selected should not be too large, since, even in this region, an air capture is required. The surface 23 contributes to the fact that the fuel jet following the arrow 21 is deflected such that an increased introduction of fuel into the pinch gap region 24 is prevented.

Figure 8:
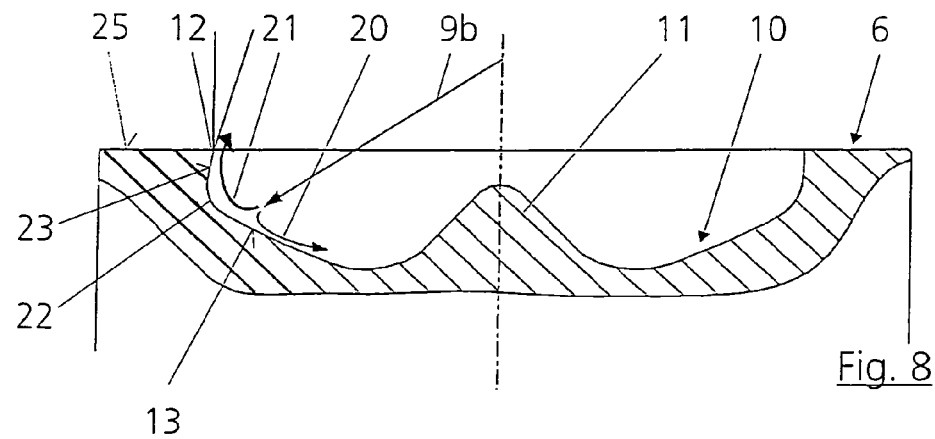
FIG. 8 is a cross-sectional view of a first embodiment of a fifth region of a piston shown in FIG. 1.
Figure 9:
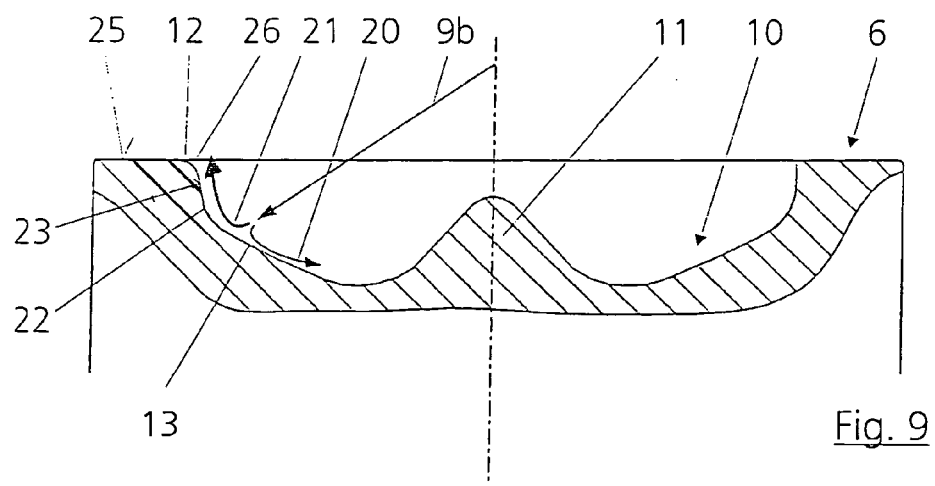
FIG. 9 is a cross-sectional view of a second embodiment of a fifth region of the piston shown in FIG. 1.
Figure 10:
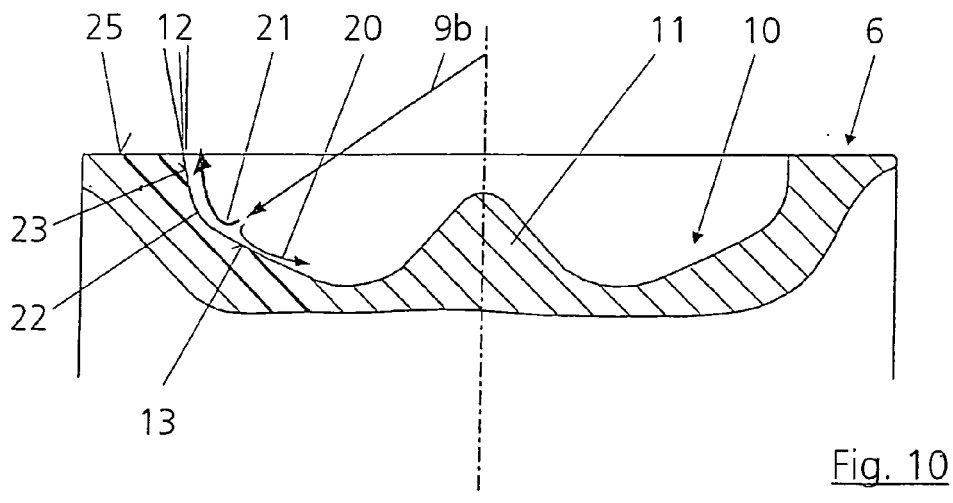
FIG. 10 is a cross-sectional view of a third embodiment of a fifth region of a piston shown in FIG. 1.

FIGS. 8, 9 and 10 illustrate various tie-ups of the surface 23 to the upper surface 25 of the piston 6.

In the embodiment according to FIG. 8, the surface 23 connected to the recess edge 12 forms an acute angle with the upper surface 25 of the piston 6. The supply of fuel to a glow plug or spark plug, not illustrated, can thereby be improved.

In the embodiment according to FIG. 9, the surface 23 merges at a radius 26 into the upper surface 25 of the piston 6.

FIG. 10 illustrates an embodiment in which the surface 23 connected to the recess edge 12 forms an obtuse angle with the upper surface 25 of the piston 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A directly injecting internal combustion engine, comprising at least one cylinder which has a combustion space in which a piston executes an oscillating movement, and an injection nozzle for injection of fuel into the combustion space, wherein the piston has a piston recess, which, in a central region thereof, has an elevation extending in a cylinder head direction, and a surface of the piston recess adjoining the elevation in a recess edge direction is connected to the elevation via a radius so that an injection jet impinging the surface and injected as early as possible is distributed both in a elevation direction and in the recess edge direction, and the surface is substantially planar and has an ascending gradient in the recess edge direction such that an injection jet injected as late as possible impinges onto the surface, the last-mentioned injection jet being distributed both in the elevation direction and in the recess edge direction.

2. The directly injecting internal combustion engine as claimed in claim 1, wherein a surface connected to the recess edge adjoins the surface of the piston recess.

3. The directly injecting internal combustion engine as claimed in claim 2, wherein the surface connected to the recess edge is connected via a radius to the surface of the piston recess.

4. The directly injecting internal combustion engine as claimed in claim 2, wherein the surface connected to the recess edge merges in a radius into an upper surface of the piston.

5. The directly injecting internal combustion engine as claimed in claim 2, wherein the surface connected to the recess edge forms an acute angle with an upper surface of the piston.

6. The directly injecting internal combustion engine as claimed in claim 5, wherein the surface connected to the recess edge is connected via a radius to the surface of the piston recess.

7. The directly injecting internal combustion engine as claimed in claim 2, wherein the surface connected to the recess edge forms an obtuse angle with an upper surface of the piston.

8. The directly injecting internal combustion engine as claimed in claim 7, wherein the surface connected to the recess edge is connected via a radius to the surface of the piston recess.

9. The directly injecting internal combustion engine as claimed in claim 1, wherein an injection angle of the injection nozzle is between 50° and 120°.

10. The directly injecting internal combustion engine as claimed in claim 9, wherein a surface connected to the recess edge adjoins the surface of the piston recess.

11. The directly injecting internal combustion engine as claimed in claim 10, wherein the surface connected to the recess edge is connected via a radius to the surface of the piston recess.

12. The directly injecting internal combustion engine as claimed in claim 10, wherein the surface connected to the recess edge forms an acute angle with an upper surface of the piston.

13. The directly injecting internal combustion engine as claimed in claim 10, wherein the surface connected to the recess edge forms an obtuse angle with an upper surface of the piston.

14. The directly injecting internal combustion engine as claimed in claim 10, wherein the surface connected to the recess edge merges in a radius into an upper surface of the piston.

* * * * *